(12) United States Patent
Ono

(10) Patent No.: US 12,743,787 B2
(45) Date of Patent: Sep. 22, 2026

(54) COMPONENT INSPECTION METHOD AND COMPONENT INSPECTION DEVICE

(71) Applicant: FUJI CORPORATION, Chiryu (JP)

(72) Inventor: Keiichi Ono, Anjo (JP)

(73) Assignee: FUJI CORPORATION, Chiryu (JP)

( * ) Notice: Subject to any disclaimer, the term of this patent is extended or adjusted under 35 U.S.C. 154(b) by 239 days.

(21) Appl. No.: 18/706,217

(22) PCT Filed: Nov. 19, 2021

(86) PCT No.: PCT/JP2021/042578
§ 371 (c)(1),
(2) Date: Apr. 30, 2024

(87) PCT Pub. No.: WO2023/089767
PCT Pub. Date: May 25, 2023

(65) Prior Publication Data
US 2024/0420338 A1 Dec. 19, 2024

(51) Int. Cl.
*G06T 7/13* (2017.01)
*G06T 7/00* (2017.01)
(Continued)

(52) U.S. Cl.
CPC .............. *G06T 7/13* (2017.01); *G06T 7/0004* (2013.01); *G06T 7/136* (2017.01); *G06T 7/70* (2017.01);
(Continued)

(58) Field of Classification Search
CPC . G06T 2207/30141; G06T 2207/30108; G06T 2207/30148; G06T 2207/30152;
(Continued)

(56) References Cited

U.S. PATENT DOCUMENTS

2002/0039142 A1* 4/2002 Zhang ...................... H04N 1/60 348/E9.01
2016/0100089 A1* 4/2016 Nozawa ............. H05K 13/0817 348/95
(Continued)

FOREIGN PATENT DOCUMENTS

CN 107945184 A * 4/2018 ............... G06T 7/10
CN 108961275 A * 12/2018 ............... G06T 7/11
(Continued)

OTHER PUBLICATIONS

International Search Report issued Feb. 8, 2022 in PCT/JP2021/042578, filed on Nov. 19, 2021, 2 pages.

*Primary Examiner* — Atiba O Fitzpatrick
(74) *Attorney, Agent, or Firm* — Oblon, McClelland, Maier & Neustadt, L.L.P.

(57) ABSTRACT

A component inspection method according to the present disclosure includes imaging an upper surface of a board on which a component is mounted to acquire a color image in which a color of each pixel is represented by luminance values of multiple primary colors, extracting a pixel having a luminance value in a predetermined range corresponding to the color of the component among pixels constituting the color image as a specific pixel, performing emphasis processing of emphasizing the luminance value of the extracted specific pixel, and determining whether the component is mounted at a correct position by performing edge detection on the color image subjected to the emphasis processing.

4 Claims, 6 Drawing Sheets

45

| COMPONENT TYPE | LUMINANCE VALUE UPPER LIMIT | | | TOLERANCE |
|---|---|---|---|---|
| | R COMPONENT | G COMPONENT | B COMPONENT | |
| COMPONENT P | R1 | G1 | B1 | T1 |
| COMPONENT Q | R2 | G2 | B2 | T2 |
| COMPONENT R | R3 | G3 | B3 | T3 |
| ⋮ | ⋮ | ⋮ | ⋮ | ⋮ |

(51) Int. Cl.
*G06T 7/136* (2017.01)
*G06T 7/70* (2017.01)

(52) U.S. Cl.
CPC ............... *G06T 2207/10024* (2013.01); *G06T 2207/20172* (2013.01)

(58) Field of Classification Search
CPC . G06T 2207/30164; G06T 7/0004–001; G06T 7/10; G06T 7/12; G06T 7/13; G06T 2207/20192; G06T 7/70; G06T 7/73; G06T 2207/10024; G01N 2021/95646; G01N 2021/8887; G01N 2021/889; H05K 13/081–0818; H05K 3/341; H05K 3/3415; H05K 3/3436
See application file for complete search history.

(56) References Cited

U.S. PATENT DOCUMENTS

2016/0203592 A1* 7/2016 Amano ..................... G06T 7/74 348/87
2019/0318514 A1* 10/2019 Kito .......................... G06T 7/12
2022/0392190 A1 12/2022 Ono et al.
2023/0029470 A1* 2/2023 Suzuki .................. G06T 7/0004

FOREIGN PATENT DOCUMENTS

JP 10-208017 A 8/1998
JP 2006-49868 A 2/2006
WO WO 2021/090395 A1 5/2021

* cited by examiner

| COMPONENT TYPE | LUMINANCE VALUE UPPER LIMIT | | | TOLERANCE |
|---|---|---|---|---|
| | R COMPONENT | G COMPONENT | B COMPONENT | |
| COMPONENT P | R1 | G1 | B1 | T1 |
| COMPONENT Q | R2 | G2 | B2 | T2 |
| COMPONENT R | R3 | G3 | B3 | T3 |
| ⋮ | ⋮ | ⋮ | ⋮ | ⋮ |

COMPONENT INSPECTION METHOD AND COMPONENT INSPECTION DEVICE

TECHNICAL FIELD

The present description discloses a component inspection method and a component inspection device.

BACKGROUND ART

Conventionally, it is known to inspect whether a component mounted on a board is at a correct position using a color image obtained by imaging the component by a camera from above. For example, Patent Literature 1 discloses that the following component inspection is executed based on an acquired color image. That is, first, an intermediate monochrome image is generated based on the RGB value of each pixel in the color image. Next, a final monochrome image in which density in the intermediate monochrome image is emphasized is generated. In the final monochrome image, contrast between a portion (for example, an electrode portion of a component) imaged in white in the color image and the other portions (for example, a background portion) is emphasized. Then, an outer shape of the component is detected from the final monochrome image, and positional deviation of the component is recognized.

PATENT LITERATURE

Patent Literature 1: JP-A-2006-49868

BRIEF SUMMARY

Technical Problem

For example, when a bottom electrode component such as a BGA or an LGA is inspected, an electrode portion does not appear even when an upper surface of a board is imaged. Therefore, even when the conventional method is applied, sufficient contrast cannot be obtained between a component portion and a background portion, and the component cannot be confirmed with sufficient accuracy.

A main object of the present disclosure is to accurately perform component inspection using a color image.

Solution to Problem

According to the present disclosure, there is provided a component inspection method including: imaging an upper surface of a board on which a component is mounted to acquire a color image in which a color of each pixel is represented by luminance values of multiple primary colors: extracting a pixel having a luminance value in a predetermined range corresponding to the color of the component among pixels constituting the color image as a specific pixel: performing emphasis processing of emphasizing the luminance value of the extracted specific pixel; and determining whether the component is mounted at a correct position by performing edge detection on the color image subjected to the emphasis processing.

In this component inspection method, the pixel having the luminance value in the predetermined range corresponding to the color of the component among the pixels constituting the color image is extracted as the specific pixel, the emphasis processing of emphasizing the luminance value of the extracted specific pixel is performed, and the edge detection is performed on the color image subjected to the emphasis processing to determine whether the component is mounted at the correct position. Accordingly, sufficient contrast can be obtained between a component portion and a background portion in the color image, and the component inspection can be accurately performed using the color image.

According to another aspect of the present disclosure, there is provided a component inspection device including: an imaging section configured to image an upper surface of a board on which a component is mounted as a color image in which a color of each pixel is represented by luminance values of multiple primary colors: a storage section configured to store a predetermined range of the luminance value of each primary color corresponding to the component; and a processing section configured to execute pixel extraction processing of extracting a pixel having the luminance value in the predetermined range among pixels constituting the color image as a specific pixel, execute emphasis processing of emphasizing the luminance value of the extracted specific pixel, and execute component inspection processing of determining whether the component is mounted at a correct position by performing edge detection on the color image subjected to the emphasis processing.

The component inspection device executes the pixel extraction processing of extracting the pixel having the luminance value in the predetermined range among the pixels constituting the color image as a specific pixel, executes the emphasis processing of emphasizing the luminance value of the extracted specific pixel, and executes the component inspection processing of determining whether the component is mounted at the correct position by performing the edge detection on the color image subjected to the emphasis processing. Accordingly, sufficient contrast can be obtained between a component portion and a background portion in the color image, and the component inspection can be accurately performed using the color image.

DESCRIPTION OF EMBODIMENTS

Figure 1:
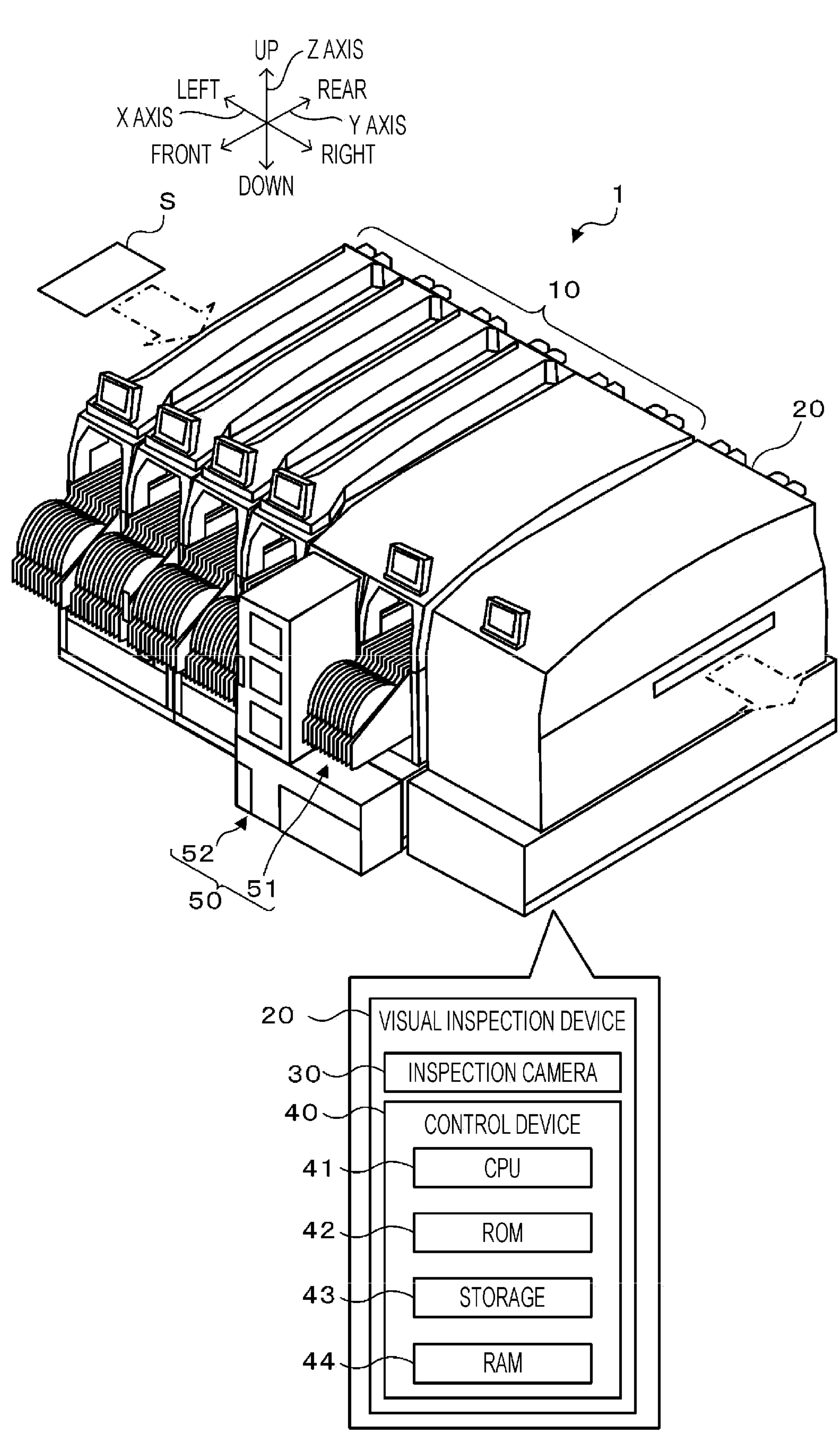
FIG. 1 is a diagram illustrating a schematic configuration of component mounting system 1.

Next, an embodiment of the present disclosure will be described with reference to the drawings. FIG. 1 is a diagram illustrating an outline of component mounting system 1 of the present embodiment. In the present embodiment, it is assumed that a left-right direction (X axis), a front-rear direction (Y axis), and an up-down direction (Z axis) are as illustrated in FIG. 1.

Component mounting system 1 includes multiple component mounters 10 and visual inspection device 20. In addition, component mounting system 1 includes a printing machine that prints solder on board S, a print inspection machine that inspects a state of the solder printed by the printing machine, a reflow device that heats board S to melt the solder and then cools board S to electrically connect the component onto board S and fix the component to board S, a management device that manages the entire component mounting system 1, and the like.

Component mounter 10 conveys board S in a conveyance direction (from left to right), and collects components supplied from component supply unit 50 by a collecting member to mount the components on board S. The components mounted on board S by component mounter 10 include, for example, a bottom electrode component having an electrode portion on the bottom surface, such as Ball Grid Array (BGA) and Land Grid Array (LGA). Component mounter 10 includes a mark camera that images a color image of board S from above, a head capable of holding multiple collecting members, a head moving device that horizontally moves the head, a lifting and lowering device that moves the collecting member up and down with respect to the head, a control device that controls entire component mounter 10, and the like.

Component supply unit 50 is detachably attached to component mounter 10. Component supply unit 50 includes tape feeder 51 which is aligned and arranged in the left-right direction (X-axis direction) and can supply the component to component mounter 10 by the tape, and tray feeder 52 which can supply the component to component mounter 10 by a tray accommodating the component. The components accommodated in the tray are components having a relatively larger size than the components accommodated in the tape. Bottom electrode components such as BGA and LGA are supplied to component mounter 10 in a state of being accommodated in a tray.

Visual inspection device 20 includes inspection camera 30 and control device 40. Inspection camera 30 is a color camera that images board S conveyed from component mounter 10 from above to generate a color image. The color image imaged by inspection camera 30 is an image in which the color of each pixel can be represented by three primary color luminance values of an R component (red), a G component (green), and a B component (blue). The luminance values of the R component, the G component, and the B component are expressed in 256 tones of 0 to 255, respectively. Control device 40 is configured as a microprocessor centered on CPU 41. In addition to CPU 41, control device 40 includes ROM 42, storage 43 (for example, an HDD or an SSD), RAM 44, or the like. Control device 40 outputs a control signal to inspection camera 30 and inputs an image signal from inspection camera 30. Further, control device 40 executes component inspection for determining whether each component on board S is mounted at a correct position based on the color image imaged by inspection camera 30. Further, control device 40 is connected to a control device provided in component mounter 10 and a management device so as to be capable of bidirectional communication, and exchanges data and control signals with each other.

Figure 2:
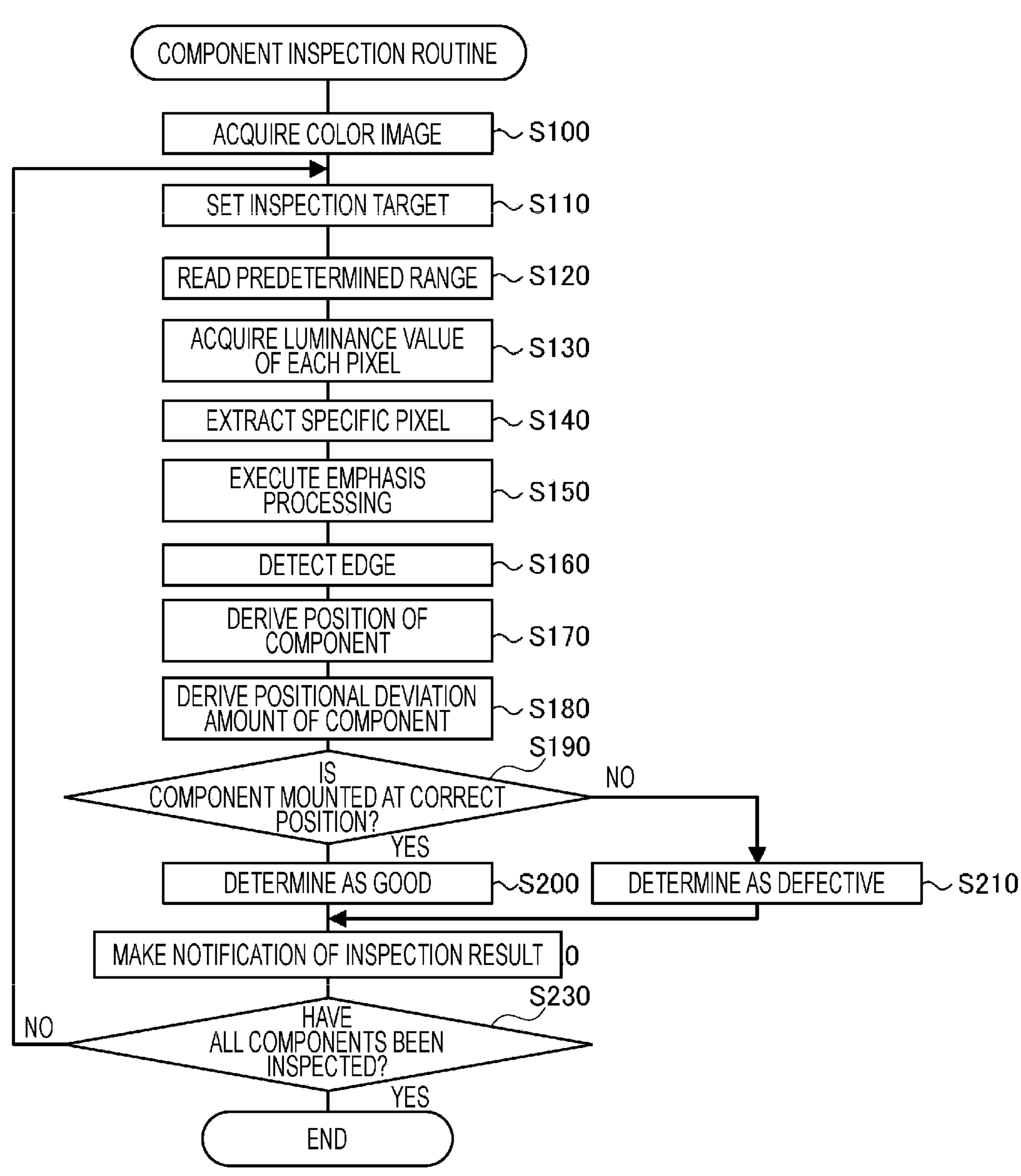
FIG. 2 is a flowchart illustrating an example of a component inspection routine.
Figure 3A:
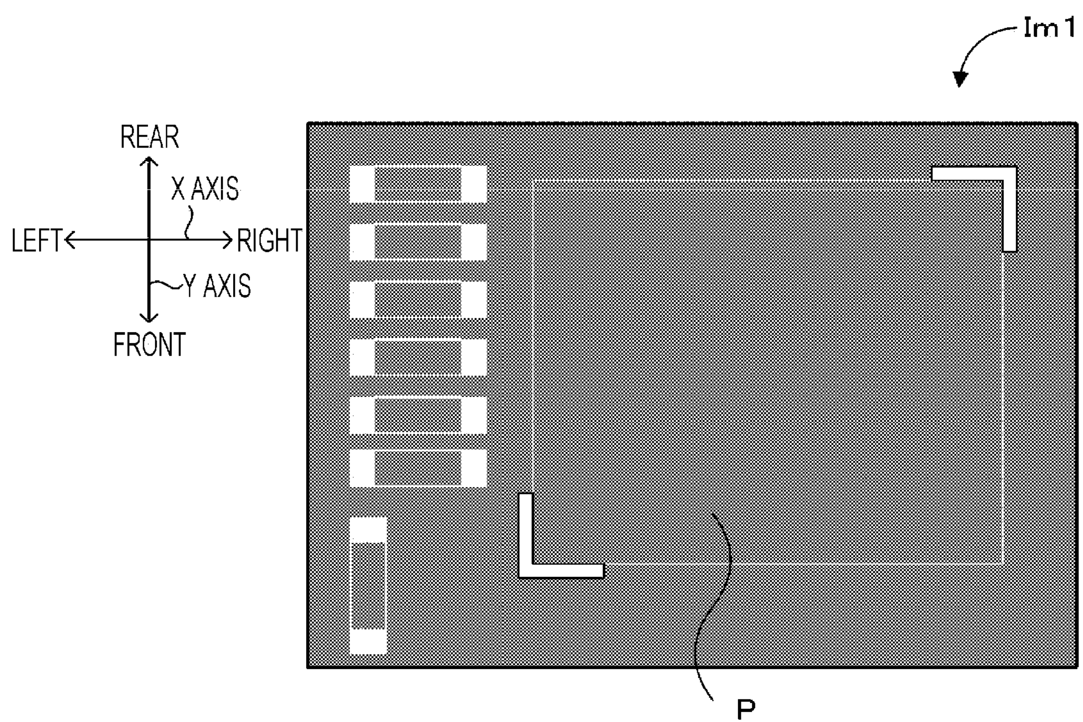
FIG. 3A is a diagram illustrating a state of component inspection.
Figure 3B:
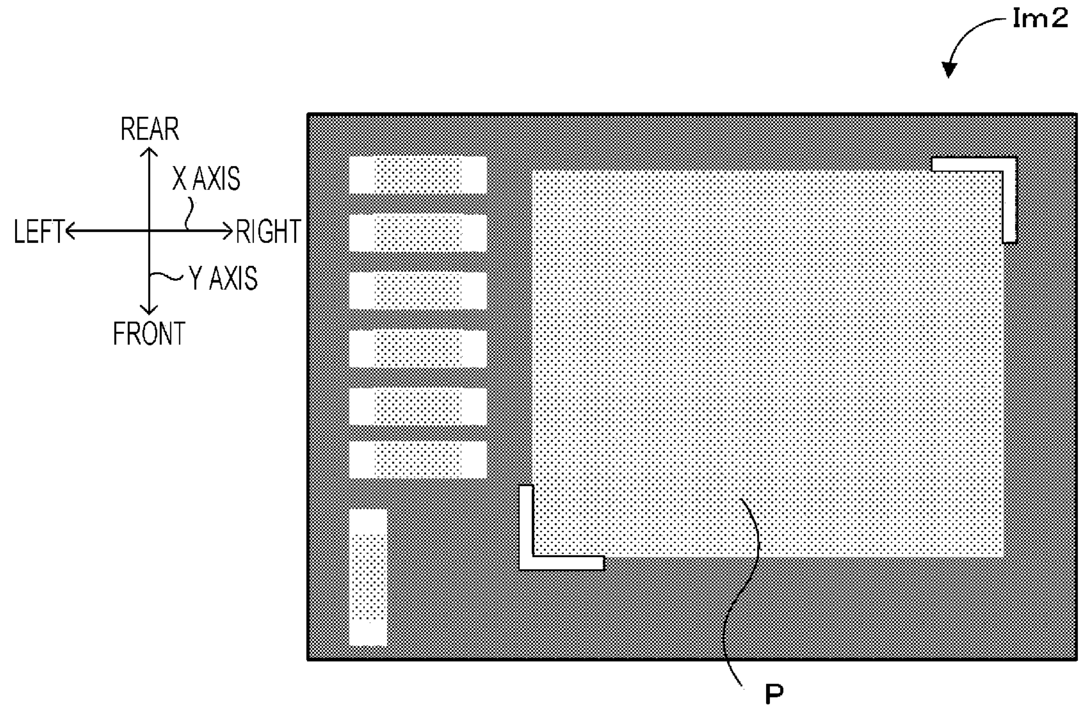
FIG. 3B is a diagram illustrating a state of component inspection.
Figure 3C:
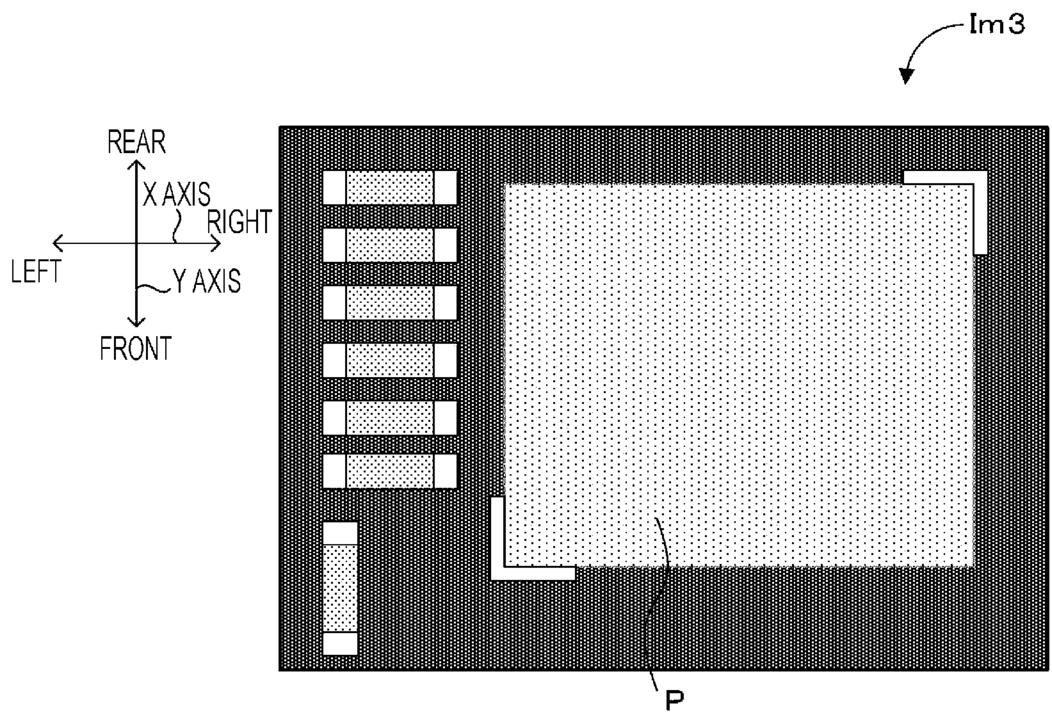
FIG. 3C is a diagram illustrating a state of component inspection.
Figure 3D:
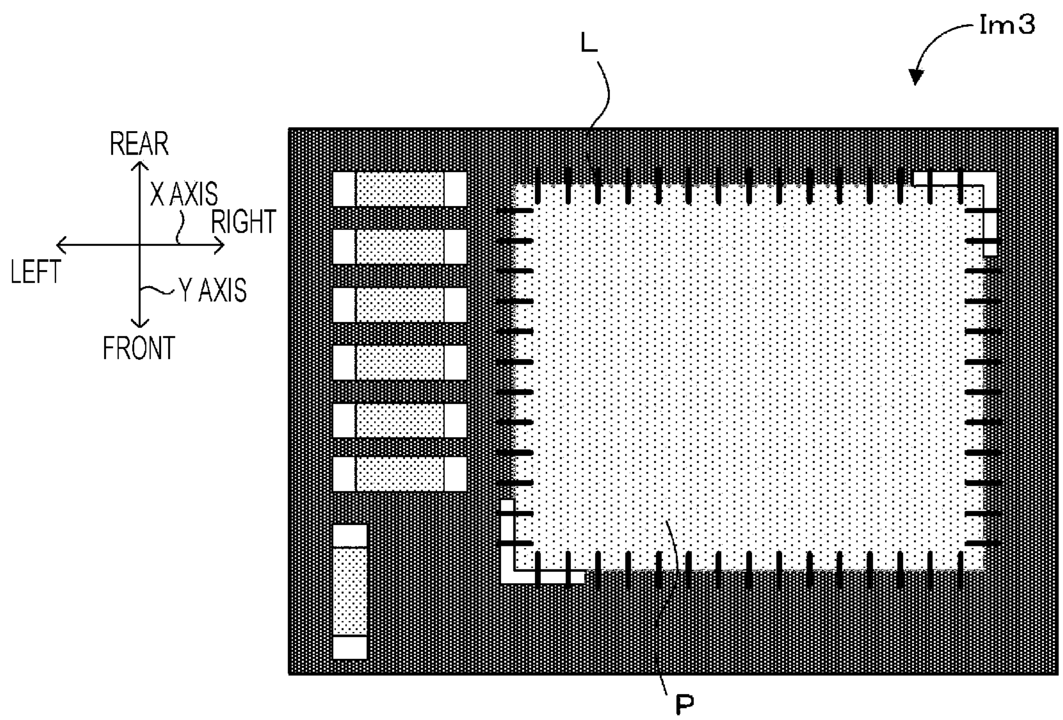
FIG. 3D is a diagram illustrating a state of component inspection.
Figure 3E:
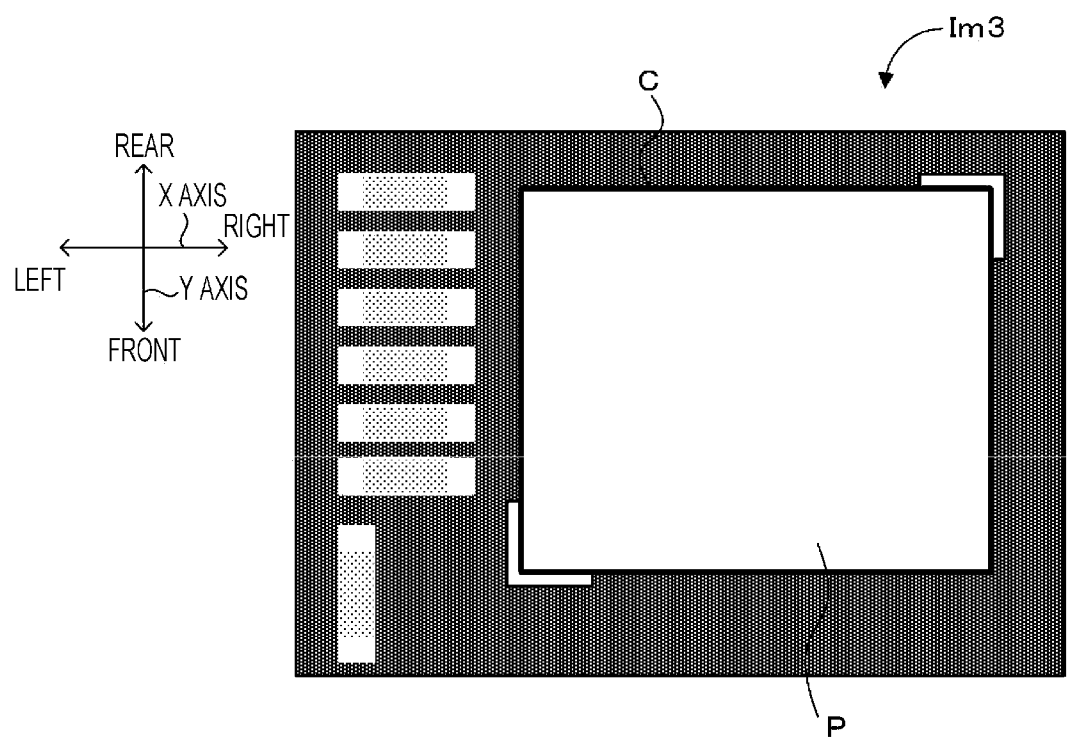
FIG. 3E is a diagram illustrating a state of component inspection.
Figure 3F:
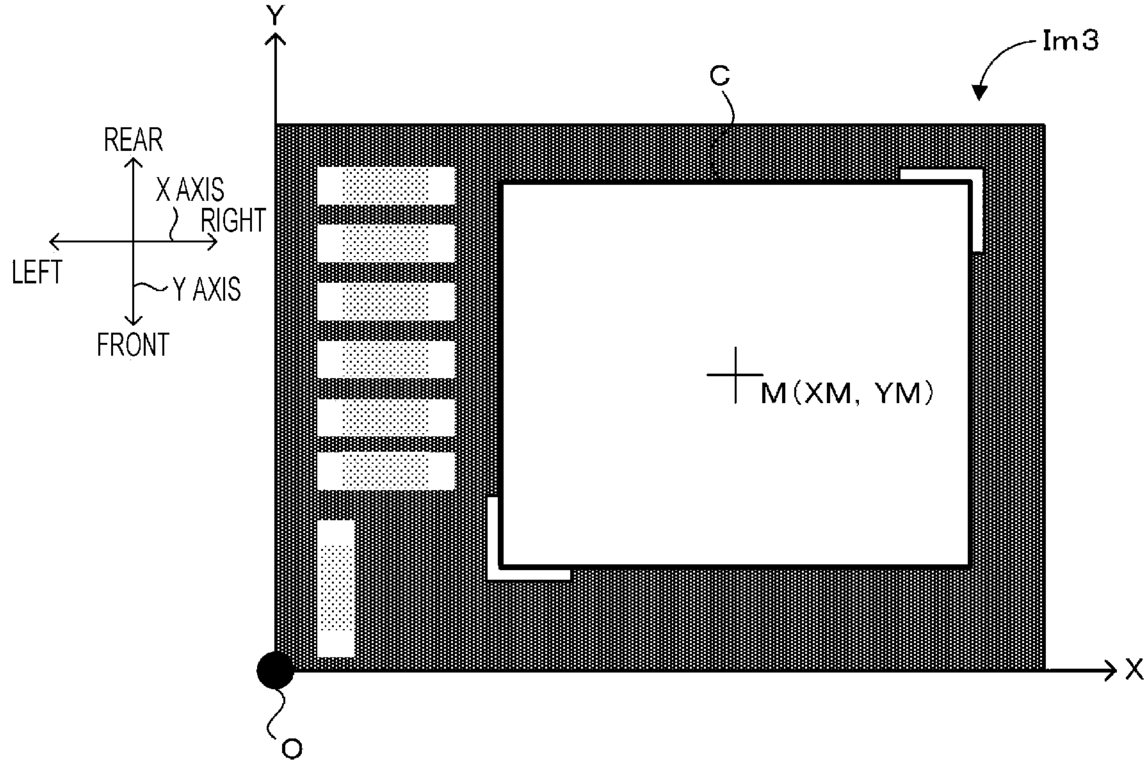
FIG. 3F is a diagram illustrating a state of component inspection.
Figure 4:
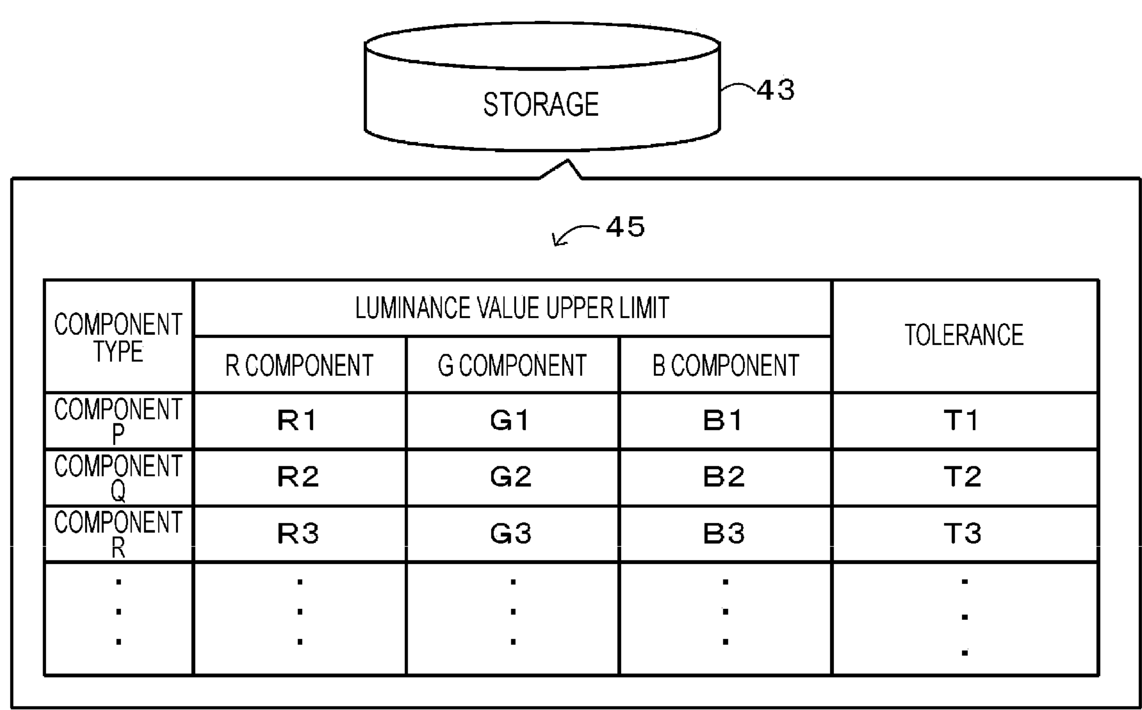
FIG. 4 is a diagram illustrating an example of luminance value upper limit data 45.
Figure 5:
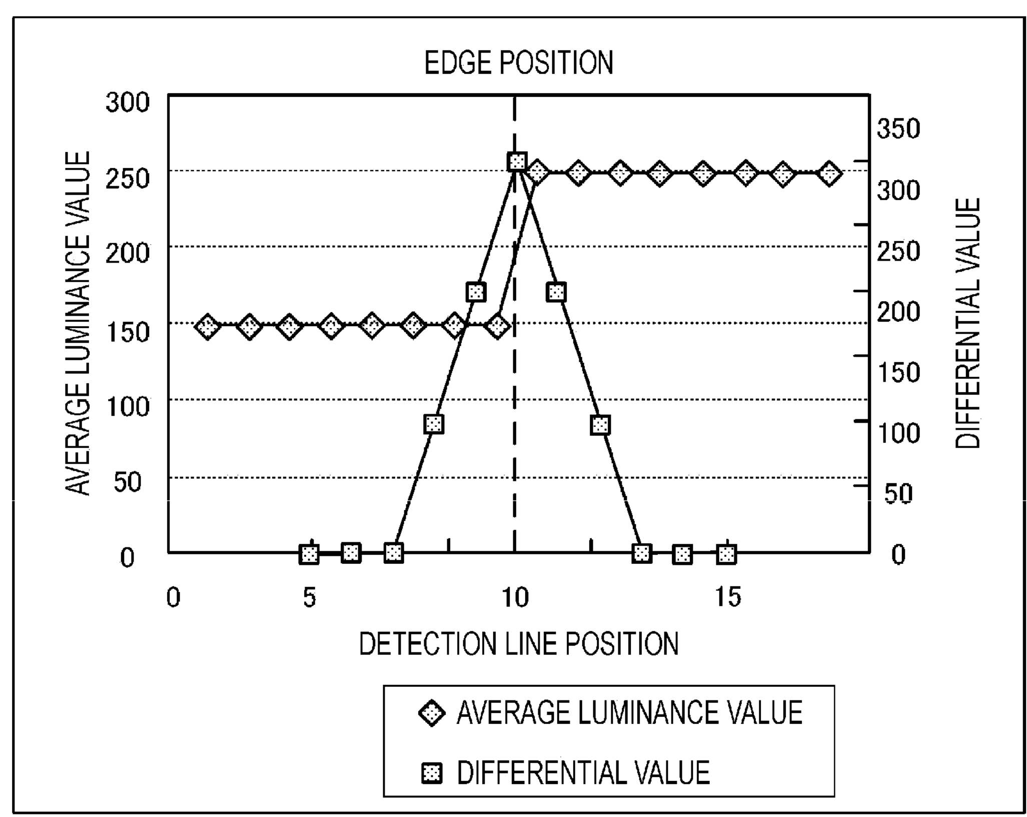
FIG. 5 is a diagram illustrating a relationship among a detection line position, an average luminance value Y, and a differential value.

Next, a component inspection routine executed by visual inspection device 20 after the component is mounted on board S by component mounter 10 will be described with reference to FIGS. 2 to 5. FIG. 2 is a flowchart illustrating an example of a component inspection routine. FIGS. 3A to 3F are diagrams illustrating a state of the component inspection. FIG. 4 is a diagram illustrating luminance value upper limit data 45. FIG. 5 is a diagram illustrating a relationship among a detection line position, average luminance value Y, and a differential value. The component inspection routine is stored in storage 43, and is executed by CPU 41 after board S is loaded from component mounter 10.

When this routine is started, CPU 41 first executes processing of imaging the upper surface of board S and acquiring a color image of board S (S100). Specifically, CPU 41 controls inspection camera 30 such that color image Im1 as illustrated in FIG. 3A is imaged.

Subsequently, CPU 41 executes processing of setting an inspection target (S110). Specifically, CPU 41 sets, as the inspection target, a component for which the component inspection has not been executed among the components mounted on board S. Hereinafter, a case where CPU 41 sets component P as the inspection target as illustrated in FIGS. 3A to 3F in S110 will be described. Component P is a bottom electrode component having an electrode portion on the bottom surface, such as BGA or LGA.

Then, CPU 41 reads a luminance value upper limit and a tolerance of an R component, a G component, and a B component corresponding to the color of component P set as the inspection target in S110 from luminance value upper limit data 45 as illustrated in FIG. 4 (S120). Luminance value upper limit data 45 is data in which the type of the component is stored in association with the luminance value upper limit and the tolerance of each primary color (R component, G component, and B component). This data is used to extract pixels having substantially the same color as the color of the component set as the inspection target in S140 described later. The luminance value upper limit is the luminance value upper limit of each primary color corresponding to the color of the component set as the inspection target in S110. The tolerance is an upper limit value of each absolute value of a difference in luminance value between the R component and the G component, a difference in luminance value between the G component and the B component, and a difference in luminance value between the B component and the R component. Here, the reason why the type of the component and the luminance value upper limit and the tolerance are stored in storage 43 in association with each other is that if the type of the component and one of the luminance value upper limit and the tolerance are stored in association with each other, a pixel having substantially the same color as the color of the component set as the inspection target in S110 cannot be extracted in S140 described later. That is, if the difference between the luminance values of the primary colors exceeds the tolerance although the luminance value of each primary color is equal to or less than the luminance value upper limit, the color may be different from the color corresponding to the component set as the inspection target in S110. Even if the difference between the luminance values of the primary colors is equal to or less than the tolerance, if the luminance value of each primary color exceeds the luminance value upper limit, the color may be different from the color of the component set as the inspection target in S110. The luminance value upper limit of the R component corresponding to the color of component P is R1, the luminance value upper limit of the G component corresponding to the color of component P is G1, the luminance value upper limit of the B component corresponding to the color of component P is B1, and the tolerance is T1. A specific value can be determined by experiments or the like. For example, when component P is black (a color in which the luminance value of each primary color is not large and the luminance value of each primary color is the same level), R1, G1, and B1 are all about 80 to 90, and T1 is about 5 to 15. Next, CPU 41 acquires luminance values of the R component, the G component, and the B component of each pixel constituting color image Im1 (S130).

Subsequently, CPU 41 executes processing of extracting pixels in which the luminance values of the R component, the G component, and the B component acquired in S130 are in a predetermined range as specific pixels (S140). This processing is processing of extracting a pixel having the color of the component set as the inspection target in S110. Specifically, CPU 41 extracts, as the specific pixel, a pixel in which the luminance value of the R component is equal to or less than R1, the luminance value of the G component is equal to or less than G1, and the luminance value of the B component is equal to or less than B1, and the absolute values of the difference in luminance value between the R component and the G component, the difference in luminance value between the G component and the B component, and the difference in luminance value between the B component and the R component are equal to or less than T1. In color image Im1, the multiple pixels are extracted. All the extracted pixels are specific pixels.

Then, CPU 41 executes emphasis processing (S150). The emphasis processing is processing of emphasizing the contrast between the region of component P and the background region in color image Im1. Specifically, CPU 41 multiplies the luminance values of the R component, the G component, and the B component of the specific pixel extracted in S140 among the luminance values of the R component, the G component, and the B component of each pixel stored in storage 43 in S130 by n to generate emphasized color image Im2 subjected to the emphasis processing as illustrated in FIG. 3B. Here, n is a number more than 1 set in advance according to the type of component. Thus, the luminance value of each primary color of the specific pixel is emphasized. Note that n may be a natural number equal to or more than 2, or may be a band decimal number more than 1. In the latter case, if results obtained by multiplying the luminance values of the R component, the G component, and the B component of each pixel by n are not integers, predetermined fraction processing may be executed to round the decimal point or less.

Next, CPU 41 executes processing of detecting edge C of component P on emphasized color image Im2 (S160). The processing of detecting edge C is executed as follows. That is, first, CPU 41 executes processing of converting emphasized color image Im2 into grayscale image Im3 as illustrated in FIG. 3C. Specifically, CPU 41 derives average luminance value Y of the luminance value (R) of the R component, the luminance value (G) of the G component, and the luminance value (B) of the B component in each pixel represented by the following expression (1), and generates grayscale image Im3 in which the color of each pixel is represented by black and white density based on average luminance value Y of each pixel. Grayscale image Im3 has a deeper black color as average luminance value Y is closer to 0, and has a deeper white color as average luminance value Y is closer to 255. Subsequently, as illustrated in FIG. 3D, CPU 41 sets detection line L for grayscale image Im3. Detection line L is for detecting a change in average luminance value Y in grayscale image Im3. Detection line L is set to straddle the region of component P and the other regions when component P is mounted at a correct position. The pattern such as the length, the arrangement position, and the number of detection lines L is set in advance for each component by empirically obtaining a range in which edge C of the component can be accurately detected. Next, CPU 41 acquires a differential value from average luminance value Y on the detection line. Next, as illustrated in FIG. 5, CPU 41 detects the position where the differential value is maximized among the detection line positions as the edge position in detection line L. Then, the same processing is executed on all detection lines L to detect edge C of component P as illustrated in FIG. 3E.

$$Y = 0.3 \times R + 0.59 \times G + 0.11 \times B \tag{1}$$

Subsequently, CPU 41 executes processing of deriving the position of component P with respect to board S based on edge C detected in S160 (S170). Specifically, CPU 41 first sets the outline (outer shape) of the inspection target component based on edge C of component P. Then, CPU 41 obtains the value of the X axis coordinate, the value of the Y axis coordinate, and the angle when component P is actually mounted. Here, the value of the X axis coordinate, the value of the Y axis coordinate, and the angle when component P is actually mounted are as follows. That is, as illustrated in FIG. 3F, when board S is an XY plane having the left front corner of board S as origin O, the value of the X axis coordinate is X axis coordinate XM of center M (intersection of diagonal lines of the outline of component P set based on edge C) of component P, the value of the Y axis coordinate is Y axis coordinate YM of center M of component P, and the angle is an angle formed by the left side of component P and a line parallel to the Y axis.

Then, CPU 41 executes processing of deriving a positional deviation amount from a target mounting position predetermined for each component (S180). Specifically, CPU 41 derives a difference (hereinafter, a difference between the values of the X axis coordinates) between the value of X axis coordinate XM of component P derived in S170 and the value of the X axis coordinate of the target mounting position, a difference (hereinafter, a difference between the values of the Y axis coordinates) between the value of Y axis coordinate YM of component P derived in S170 and the value of the Y axis coordinate of the target mounting position, and a difference (hereinafter, a difference between the angles) between the angle of component P derived in S170 and the angle of the target mounting position.

Next, CPU 41 determines whether the component is mounted at a correct position (S190). Specifically, CPU 41 determines whether all of the difference in the value of the X axis coordinate, the difference in the value of the Y axis coordinate, and the difference in the angle are within a predetermined allowable range.

When all of the difference in the value of the X axis coordinate, the difference in the value of the Y axis coordinate, and the difference in the angle are within the allowable range, CPU 41 determines that the mounting state of component P is good (S200). Meanwhile, when the positional deviation amount of component P derived in S180 is not within the allowable range, CPU 41 determines that the mounting state of component P is defective (S210).

Luminance value upper limit data 45, data related to the information of the target mounting position, data related to the information of the allowable range of the positional deviation amount, and the like are generated in advance by an operator inputting the data to control device 40 of visual inspection device 20 through an input device (not illustrated), and are stored in storage 43.

After S200 or S210, CPU 41 executes processing of displaying the result of the component inspection on a display section (not illustrated) of visual inspection device 20 (S220) and storing the type of the component and the inspection result in storage 43 in association with each other. Subsequently, CPU 41 determines whether the component inspection has been executed on all the components mounted on board S (S230).

When a negative determination is made in S230, CPU 41 returns to S110 again, sets the component for which the component inspection has not been executed yet as the inspection target, and repeatedly executes the processing from S120 to S230. Meanwhile, in a case where an affirmative determination is performed in S230, CPU 41 terminates the present routine.

Here, a correspondence relationship between the elements of the present embodiment and the elements of the present disclosure will be clarified. Visual inspection device 20 of the present embodiment corresponds to a component inspection device of the present disclosure, inspection camera 30 corresponds to an imaging section, storage 43 corresponds to a storage section, and CPU 41 corresponds to a processing section.

In the component inspection routine described above in detail, pixels having luminance values in a predetermined range corresponding to the color of component P among the pixels constituting color image Im1 are extracted as specific pixels (S140), emphasis processing for emphasizing the extracted specific average luminance value is performed (S150), edge detection is performed on emphasized color image Im2 subjected to the emphasis processing (S160), and it is determined whether component P is mounted at a correct position (S190). Accordingly, the component inspection can be accurately performed using color image Im1.

In the component inspection routine, in the predetermined range, the luminance value of each primary color is equal to or less than the luminance value upper limit and the luminance difference of each primary color is equal to or less than the tolerance (S140). Therefore, it becomes easier to extract the specific pixel more accurately.

In the component inspection routine, component P is a bottom electrode component having an electrode portion on the bottom surface. In the inspection of the component by performing the edge detection, average luminance value Y of each pixel is often used. In the bottom electrode component such as component P, since electrode E is not imaged, average luminance value Y is likely to be equal between the region of component P and the region of board S. Therefore, it is difficult to detect edge C, and it is difficult to determine whether the component is mounted at a correct position in many cases. Accordingly, it is significant to apply the component inspection routine described above.

Further, in visual inspection device 20, pixel extraction processing of extracting a pixel having a luminance value in a predetermined range among the pixels constituting color image Im1 as a specific pixel is executed, emphasis processing of emphasizing the luminance of the extracted specific pixel is executed, and component inspection processing of determining whether a component is mounted at the correct position is executed by performing edge detection on emphasized color image Im2 subjected to the emphasis processing. Accordingly, the component inspection can be accurately performed using color image Im1.

In the above-described embodiment, average luminance value Y is used when the processing of detecting edge C is executed in S160 of the component inspection routine. However, processing of detecting edge C using the luminance value of any one primary color among the luminance values of the primary colors may be executed. Alternatively, processing of detecting edge C using a weighted average of luminance values of two primary colors may be executed.

In the embodiment described above, the component inspection device of the present disclosure is described as visual inspection device 20, but the component inspection device of the present disclosure may be component mounter 10. In this case, only acquiring the color image obtained by imaging the upper surface of board S using a mark camera is needed. In this case, the component inspection may be executed every time the component is mounted by component mounter 10, or the component inspection may be executed after all the components to be mounted in the own device are mounted. Alternatively, the component inspection may be executed on the component mounted by component mounter 10 disposed upstream of the own device in the conveyance direction.

In the embodiment described above, the component inspection device is described, but a component inspection method may be used.

INDUSTRIAL APPLICABILITY

The present disclosure is applicable to a component mounting system in which a component mounter is incorporated.

REFERENCE SIGNS LIST

1: component mounting system, 10: component mounter, 20 visual inspection device, 30: inspection camera, 40: control device, 41: CPU, 42: ROM, 43: storage, 44: RAM, 45: luminance value upper limit data, 50: component supply unit, 51: tape feeder, 52: tray feeder, C: edge, E: electrode, Im1: color image, Im2: emphasized color image, Im3: grayscale image, L: detection line, M: center, O: origin, P: component, S: board, XM: X axis coordinate, Y: average luminance value, YM: Y axis coordinate

The invention claimed is:

1. A component inspection method comprising:

imaging an upper surface of a board on which a component is mounted to acquire a color image in which a color of each pixel is represented by luminance values of multiple primary colors;

extracting a pixel having a luminance value in a predetermined range corresponding to the color of the component among pixels constituting the color image as a specific pixel;

performing emphasis processing of emphasizing the luminance value of the extracted specific pixel; and determining whether the component is mounted at a correct position by performing edge detection on the color image subjected to the emphasis processing.

2. The component inspection method according to claim 1, wherein in the predetermined range, the luminance value of each primary color is equal to or less than a predetermined value and a luminance difference of each primary color is equal to or less than a predetermined difference.

3. The component inspection method according to claim 1, wherein the component is a bottom electrode component having an electrode portion on a bottom surface.

4. A visual inspection device comprising:

an inspection camera configured to image an upper surface of a board on which a component is mounted as a color image in which a color of each pixel is represented by luminance values of multiple primary colors;

a storage configured to store a predetermined range of the luminance value of each primary color corresponding to the component; and processing circuitry configured to execute pixel extraction processing of extracting a pixel having the luminance value in the predetermined range among pixels constituting the color image as a specific pixel, execute emphasis processing of emphasizing the luminance value of the extracted specific pixel, and execute component inspection processing of determining whether the component is mounted at a correct position by performing edge detection on the color image subjected to the emphasis processing.

* * * * *